United States Patent [19]
Donato et al.

[11] Patent Number: 5,853,653
[45] Date of Patent: Dec. 29, 1998

[54] PROCESS FOR PRODUCING CERAMIC MATRIX COMPOSITES BY LIQUID INFILTRATION OF CERAMIC POLYMERIC PRECURSORS

[75] Inventors: Aldo Donato, Rome; Carlo Alberto Nannetti, Leghorn; Alberto Ortona, Naples; Elisabetta Borsella, Grottaferrata; Sabina Botti, Rome; Sergio Casadio, Anguillara Sabazia; Gianni D'Alessandro, Bracciano; Antonio Alessandro Licciulli, Mesagne; Stefano Martelli, Rome; Amedeo Masci, Vetralla, all of Italy

[73] Assignee: Enea Ente Per Le Nuove Technologie, L'Energia E L'Ambiente, Rome, Italy

[21] Appl. No.: 826,785

[22] Filed: Apr. 7, 1997

[30] Foreign Application Priority Data

Apr. 5, 1996 [IT] Italy ................................ RM96A0220

[51] Int. Cl.$^6$ .................................................. C04B 35/80
[52] U.S. Cl. ......................... 264/625; 264/640; 264/641; 264/642; 264/643; 423/345
[58] Field of Search ..................................... 264/640, 641, 264/625, 642, 643; 423/345

[56] References Cited

U.S. PATENT DOCUMENTS 4,837,230  6/1989  Chen et al. ................................ 501/88
5,698,143  12/1997  Teni ........................................ 264/625

FOREIGN PATENT DOCUMENTS 536866  4/1993  European Pat. Off. .
626360  11/1994  European Pat. Off. .
9535268  12/1995  WIPO .

*Primary Examiner*—James Derrington
*Attorney, Agent, or Firm*—Stevens, Davis, Miller & Mosher, L.L.P.

[57] ABSTRACT

Ceramic matrix composites (CMC) of high density, preferably of the type SiC/SiC, are provided by a production process based on the infiltration of ceramic fiber cloths with a polymeric precursor solution containing, as fillers, inert powders having size much lower than the mean distance among the ceramic fibers which are used as basic material for the manufacturing of CMC, typically a nanometric granulometry. Such step is followed by the steps of hardening the cloths, pyrolysis of the polymer and repeated thickenings until the desired density is reached. A possible alternative process comprises a brief (<24 hours) treatment of infiltration of SiC from the vapor phase (CVI) with precursors and typical operative parameters for the deposition of silicon carbide followed by the repeated thickenings.

23 Claims, 2 Drawing Sheets

PROCESS FOR PRODUCING CERAMIC MATRIX COMPOSITES BY LIQUID INFILTRATION OF CERAMIC POLYMERIC PRECURSORS

This application claims priority under 35 USC §119 from Italian Patent Application No. RM96A000220, filed Apr. 5, 1996, incorporated herein by reference.

FIELD OF THE INVENTION

The present invention relates to the production of a ceramic matrix composite (CMC) reinforced by fibers of the ceramic type.

BACKGROUND OF THE INVENTION

As known, CMCs are a class of technologically advanced materials which have been increasingly developed in recent years for industrial applications in leading sectors such as aerospace, energy, and the automobile industry due to their very high mechanical strength, chemical inertness and heat resistance along with their further feature of lightness.

In addition, studies for the application of such materials in the construction of future controlled thermonuclear fusion reactors are being conducted in USA, Japan and Europe.

The basic mechanical characteristic of CMCs is the capability of breaking under loaded conditions in a non-catastrophic manner unlike the monolithic ceramic materials of fragile nature for which the design of structural components is very difficult. The reason for such advantageous mechanical behavior of CMCs is the deflection of the cracks caused in the ceramic matrix by a thermal or mechanical stress to the direction of the fiber-matrix interphase.

As far as the basic materials are concerned, several types of ceramic matrices and ceramic fibers may be used for the production of CMCs. However, one preferred CMC is certainly the SiC/SiC fiber which is currently used in space and military fields, particularly in France, for the construction of parts of Arianne missile and Rafale aircraft produced by SEP Company.

A particular process, so-called CVI (Chemical Vapor Infiltration), is nowadays known and already used on an industrial scale by the above-mentioned SEP Company for the construction of CMCs. The CVI process well-known to those skilled in the art is based on the inlet of gas precursors of SiC (e.g., methyl-trichlorsilane) into high-temperature furnaces containing ceramic fiber materials preformed in the desired shape. The gases decompose in the furnace forming in the ceramic fiber materials the ceramic matrix which is formed of silicon carbide (SiC) in case of SiC/SiC fiber CMC. The decomposition of the gases should be carried out slowly according to a determined kinetics allowing a complete infiltration, preferably from the inside of the material, which then requires a very long time in the order of several months for the construction of 5–6 mm thick pieces.

Products having mechanical characteristics fully satisfying the specification required for their use are provided by such a process. However, the process suffers from non-negligible problems, particularly as far as the production cost is concerned which is very high above all because of the very long production time. For these reasons it is almost impossible to manufacture thick pieces which would be necessary, for example, for the construction of large plants such as future controlled thermonuclear fusion magnetic-confinement reactors as well as other some centimeters thick components.

In order to overcome such problems, research aiming at the set-up of alternative CMC production methods which are more effective and suitable for the construction of large-size components are being conducted in the most advanced countries such as France, Germany, USA and Japan.

Among such alternative methods, even if not yet used on industrial scale, one process is being studied is based upon the infiltration of preformed fiber materials with not gaseous, but liquid, ceramic polymeric precursors at the melted state or in solution. In such a process, the precursor changes into the ceramic matrix by a thermal pyrolysis treatment, binding the fibers and having an amorphous or nanocrystalline structure according to the pyrolysis temperature of the thermal pyrolysis treatment.

One problem of such a process appears during the pyrolysis in which a considerable loss of weight of the precursor (25–40%) takes place because of evaporation of oligomers and structural rearranging with evolution of gases such as methane, other hydrocarbons and hydrogen. At the same time the transformation of a polymeric material having a typical density of about 1 $g/cm^3$ into a ceramic material of higher density (2.5–2.7 $g/cm^3$ in the case of SiC precursors) implies a strong bulk contraction with production of high porosity in the matrix being formed.

In order to overcome such a problem, one known solution is to repeat several times the infiltration and pyrolysis processes for reducing the porosity and hardening the matrix. Unfortunately, almost 8–10 cycles are necessary to thicken the matrix to a satisfying degree. The necessity for these many cycles is a significant waste of time.

A second solution is to use, along with the preceramic polymer, inert "fillers" such as powders of SiC which do not undergo bulk contraction during the thermal treatment and are compatible with the material of the matrix. Such powders are resorted to because they allow the voids in the fiber materials and among the material layers to be better filled to reduce the total number of the necessary infiltration and pyrolysis cycles in the whole process.

The currently used inert fillers are commercially available SiC powders of micrometric granulometry. Such powders suffer, however, from further problems. These problems include the non-homogeneous distribution of the powder as the powder particles hardly enter the fiber bundles (typically formed of 500–1000 fibers of 5–15 $\mu$m diameter). The gaps among the fibers are by two orders of magnitude narrower than the size of the fibers.

Moreover, the amorphous or nanocrystalline nature of the matrix produced by the pyrolysis of preceramic polymers can be affected by the presence of crystalline particles having much larger size, thus impairing the mechanical characteristics.

As can be seen from the foregoing, a CMC having improved mechanical characteristics, particularly as far as density and homogeneity of the matrix is concerned, is still desired. It is also important for the industry that such a material can be produced with industrially practical time and cost as well as with large enough thickness to be used, for instance, as structural components in large plants.

SUMMARY OF THE INVENTION

One object of the present invention is to overcome the problems of the known CMCs and processes for the production thereof.

Such object is achieved according to the invention by manufacturing CMCs of high density, preferably of the type SiC/SiC, by a production process based on the infiltration into ceramic fiber materials of a polymeric precursor solution containing, as filler, inert powders of much lower size than the mean distance among the ceramic fibers used as basic materials for the manufacturing of CMCs and typically having a nanometric granulometry. Such infiltration step is followed by the steps of material hardening and polymer pyrolysis, and by repeated thickening (densifying) steps until the desired density is reached.

Advantageously, it was found that the use of such powders as fillers in the CMC production process does not have the problems of the known powders because the reduced granulometry also allows the gaps between the single fibers to be filled in a generally homogeneous manner.

A second advantage is that the amorphous or nanocrystalline structure of the preceramic polymer matrix is not substantially affected by the presence of particles still of nanometric size after the pyrolysis.

A third advantage is that such nanometric powders homogeneously dispersed into an initially amorphous matrix can act as crystallization nucleus for the same matrix starting the crystallization at such a temperature as not to impair the microstructure, the chemical development, and the mechanical characteristics of the fibers.

A further advantage is that the use of nanometric powders as inert fillers lends itself particularly to technologies such as prepreg or preimpregnation of the single fiber cloths followed by the hardening of piles of the cloths, or techniques like resin transfer molding (RTM), on already piled up material layers. However, the advantages of using nanometric powders are even more apparent if the technique of liquid infiltration and pyrolysis is applied to tridimensional preformed fiber materials to which only particles of extremely reduced size can be uniformly fed, for example, by colloidal filtration of diluted suspensions.

According to a further feature, the production process according to the invention can also provide, in addition to fillers with nanometric granulometry, a preliminary step comprising a brief treatment (up to 24 hours) of precursor infiltration into SiC from the vapor phase (CVI) with the typical operative parameters for the deposition of silicon carbide. Such a treatment seeks to give to a bidimensional assembly of overlapped fiber materials a rigid tridimensional structure which is fully open, through the gaps between fibers, to the infiltration of liquid agents containing nanometric powders used in the following repeated thickening steps described in detail hereafter.

BRIEF DESCRIPTION OF THE DRAWINGS

These and further advantages of the invention will be more readily understood by anyone skilled in the art from the following description with reference to the accompanying; not limiting, exemplicative drawings and tables. In the drawings.

DESCRIPTION OF THE PREFERRED EMBODIMENTS

Figure 1:
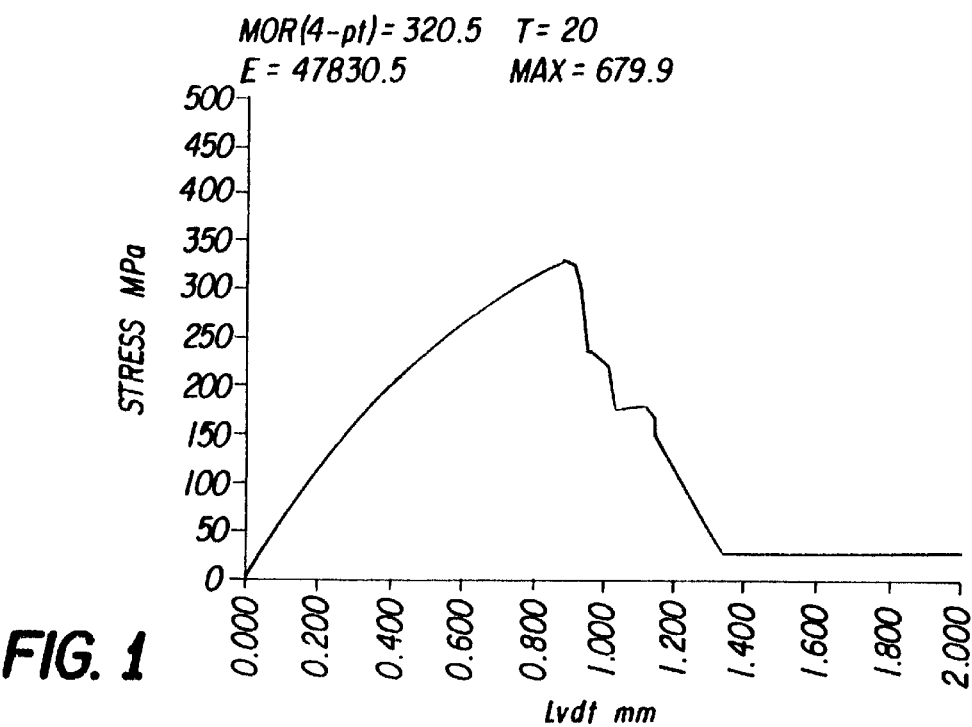
FIG. 1 is a typical load/deformation diagram of the material prepared according to the present invention.

The process for the production of ceramic matrix composites (CMC) according to the invention comprises the following steps which in the described example relate to a preferred embodiment for the production of flat panels of SiC/SiC fibers.

As can be seen and for a better understanding of the claimed results, the following description exemplifies the differences in the characteristics of the materials which can be obtained according to the invention. The description compares material obtained by using liquid infiltration/pyrolysis without using nanometric powders against material obtained by the liquid infiltration pyrolysis of the present invention using increasing amounts of such powders according to the described process, and material obtained by the process of the present invention using nanometric powders and carrying out a short preliminary infiltration from the described vapor phase (CVI).

In the shown example, the used polymeric SiC precursor is polycarbosilane (Nippon Carbide, Japan). Polycarbosilane (PCS) is a general term indicating a class of organic silicon polymers which produce a ceramic SiC residue as a result of a pyrolysis treatment at a temperature T>800° C. under controlled atmosphere. SiC fibers are of the type commercially known as NICALON (Nippon Carbide, Japan) which are carbon coated, i.e., have a surface deposit of pyrolytic carbon of a typical thickness of 0.1–1 $\mu$m and a diameter of approximately 15 $\mu$m.

The process according to the invention for the production of ceramic matrix composites (CMC) comprises the following steps:

Step I: preimpregnating the single ceramic fiber materials with precursors dissolved in a solution also containing nanometric powders;

Step II: hardening the materials obtained from step I;

Step III: pyrolysis;

In an alternative embodiment steps I, II, and III can be replaced by a first step IB for stiffening a pile of overlapped materials (the number of which is proportional to the thickness and the desired proportion of fibers in the final composite) by a brief (up to 24 hours) treatment of chemical infiltration of silicon carbide from the vapor phase with the typical operative parameters of such technology.

Step IV (performed after Steps I, II and III or after Step IB): repeated thickenings until the density of the panels is believed satisfactory.

In detail: in step I, the powdered polycarbosilane (PCS) is solubilized in hydrocarbons, for example, toluene having a concentration of 50–70% by weight. In case of infiltration of SiC nanometric powder, the latter is dispersed in advance into the same solvent with a concentration of 10% by weight by means of devices with very strong shearing action, e.g. attritors. In order to facilitate the dispersion and lower the viscosity of the solution it is advantageous to subject the nanometric powder to a surface treatment with sterically acting dispersants, e.g. higher linear alcohols such as octanol or dodecanol or others in a quantity of 1–2% by weight based on the powder weight.

By homogeneously mixing the two preparations described above, a resin is obtained in which the PCS-SiC powders ratio is defined by the concentrations and the utilized amounts of solution and dispersion. For example, in the production of the following shielding panels of SiC/SiC fiber material, the weight ratio between the two components is as listed in TABLE I:

TABLE I

| PANELS | PCS/SiC POWDERS |
|---|---|
| CMC 0 | 10:0 |
| CMC 20 | 8:2 |
| CMC 30 | 7:3 |
| CMC 40 | 6:4 |

For the preimpregnation of single cloths containing ceramic fiber materials a number of well known methods may be employed without substantial differences such as manual dipping of the cloths into the solution/dispersion, spreading of the latter by brush or knife, or automated methods such as tape casting. In such step it is not required to ensure an absolutely homogeneous distribution of the mixture as such a mixture is homogeneously distributed in the following hardening step. It is instead very important to check the total amount of impregnating agent to be sufficient to fill all of the voids among the fibers. The voids are a function of the characteristics of the fibers, the texture thereof, and the desired fiber bulk fraction in the final composite.

By way of example, by using NICALON fibers having a mass per unit surface of 220 g/cm$^3$ it is necessary to use about 60 g of a PCS/nanometric powders mixture (the latter being 30% by weight) for every 100 g of fibers so as to provide a final product having a fiber bulk fraction between 35 and 40%.

In cloth hardening step II, after the evaporation of the solvent, the cloths infiltrated in advance are piled up (in an alternating transverse manner) in a number proportional to the final thickness of the panel being prepared (e.g., 4 layers for one millimeter thickness) so that the fibers are oriented to 0° and 90°. At this point the hardening is carried out, for example, in a bag which can be deformed under vacuum. After evacuation of the tight bag containing the panel, the latter is gradually heated (e.g., 10° to 15° C. per minute) to about 300° C. under a press exerting a light coupling pressure. Thereafter a pressure of 10/40 kg/cm$^2$ is applied and the whole panel is kept in such a state for 10 minutes, and then cooled under pressure. Under such conditions the melted thermoplastic resin is homogeneously distributed so as to fill any macro- and microcavity in the material and to perfectly size the layers to one another.

In pyrolysis step III, the panels prepared as described above are filled into a furnace so that the flow of an inert gas (in this case argon) which is passed through the furnace can overlap (contact) the surfaces of the panels. In addition, in order to avoid deformation (particularly during the first cycle of pyrolysis) it is convenient to support the panel as the still partially thermoplastic resin does not provide a sufficient rigidity to the assembled cloths.

The pyrolysis is carried out at 1100° C. with a thermal cycle of about 36 hours as a whole according to a heating program providing a gradient of 8°–10° C./hour in the temperature range (300°–650° C.). The gradient in this temperature range is highly preferred for the process.

In the following thickening step IV, after the first pyrolysis, a product stiffening effect is provided by filling the voids left during the pyrolysis by the decomposition of the polymer and the following bulk contraction of the latter during the transformation to the ceramic phase, i.e. SiC in the described embodiment. This is achieved by the alternation of polymer infiltration and pyrolysis. Thus the density of the manufactured composite matrix material is increased. A mixture of 50–70% by weight of PCS in toluene is used for the thickening.

The reinfiltration operations during the repeated steps of thickening can be advantageously carried out with quite similar results by known technologies of the state of the art such as resin transfer molding (RTM) or by using a surge tank with due caution of emptying the die for RTM before injecting the resin solution or the surge tank before dipping the composite into the solution.

In both technologies the resin solution is pressurized directly in RTM, indirectly through gas overpressure in the surge tank. In any event, because of the wettability and the low viscosity of the solution, the pressure for the complete infiltration through the open pores of the material is limited to some bars (2–8). Preferably the pressure increases in such range as the repeated thickenings succeed one another so that the number and above all the size of the residual pores of the material tend to decrease.

After controlled evaporation of the solvent at a temperature much lower than the boiling point of the solvent (not greater than 50°–60° C. under atmospheric pressure) a pyrolysis treatment quite similar to that already described is carried out.

When the above mentioned step IB of stiffening a pile of fiber cloths by a brief treatment of infiltration of SiC from the vapor phase is employed as an alternative to steps I, II, and III, the repeated thickenings are still carried out by the methods described above with the only difference that it is advantageously used, as infiltration agent for the first thickening, the PCS solution also containing filling nanometric powders, in this case, with a concentration not greater than 30% by weight related to PCS.

In the following Table II there are shown the most significant characteristics of the panels prepared without using filling nanometric powders, by using the same in increasing amounts, and by employing the step of stiffening a pile of fiber cloths by the brief treatment of deposition of SiC from the already mentioned vapor phase as an alternative to the first three steps of the basic process.

TABLE II

| Nanometric powders (arbitrary units) | Porosity (%) | Flexural strength (MPa) |
|---|---|---|
| 0 | 22 | 150 |
| 20 | 20 | 205 |
| 30 | 18.5 | 235 |
| 40 | 17 | 260 |
| CVI + 30 | 14 | 370 |

As can be seen from the above data of TABLE II, the presence of increasing amounts of nanometric powders increases both the density (lower porosity) and the mechanical strength of the panels ready to use. Furthermore, it is evident that the brief treatment of deposition of SiC from the vapor phase, as an alternative to the first three steps of the basic process, advantageously improves the flexural strength without increasing the processing time.

Figure 2:
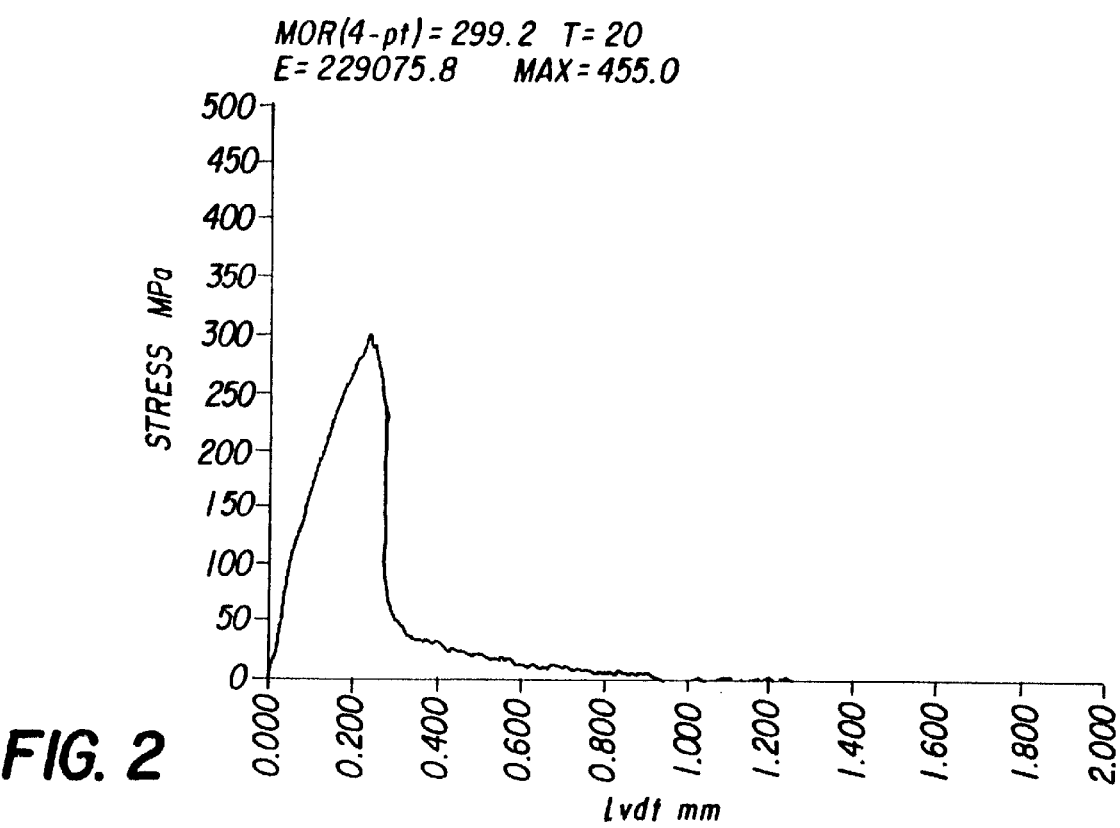
FIG. 2 is a load/deformation diagram of a typical commercial material prepared by CVI.

A further meaningful difference between the composites of the present invention and those provided only by infiltration from the vapor phase is the behavior in case of deformation under loaded conditions. The materials provided by the present invention have a capability of being deformed much greater than 1%, upon yielding, and as high as more than twice that of the composites provided only by CVI, as shown in FIGS. 1 and 2.

Figure 3:
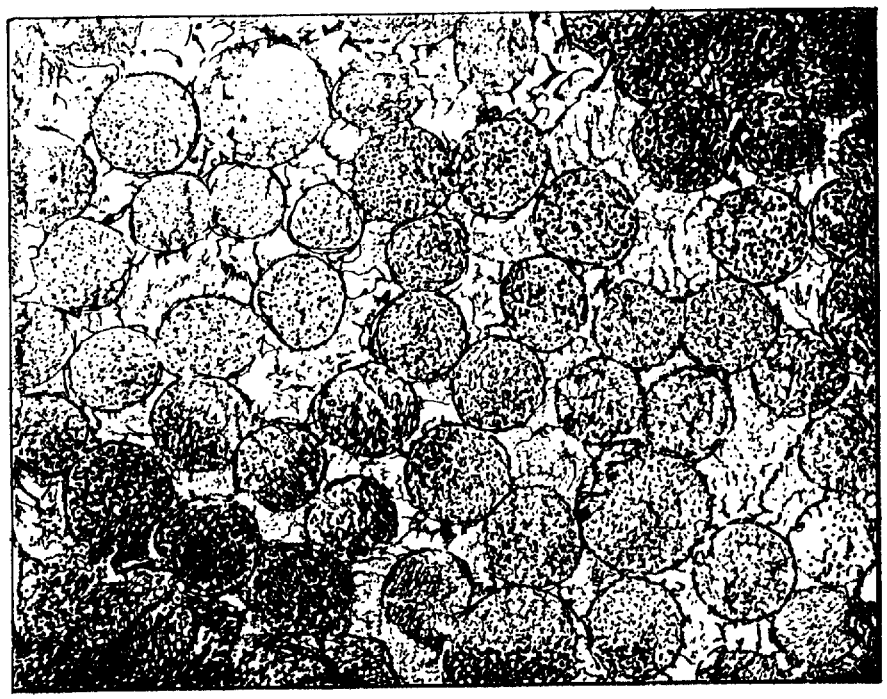
FIG. 3 shows the typical microstructure of the material prepared according to the invention by using nanometric powders (800X).

The microstructure of the produced material is shown in FIG. 3. It is self-evident that the microstructure of the material produced by using nanometric powders is very homogeneous and without large cavities.

The product according to the present invention certainly has better characteristics than the material produced by using fillers of micrometric size at least with regard to the homogeneity of the matrix which has no large-size crystallites of SiC and is not greatly heterogeneous anymore.

Advantageously, the production time of a 5–8 mm thick panel is about two weeks compared with the much longer time requested by a CVI process. In addition, the use of nanometric powders allows a high final density of the product to be reached with a number of thickenings lower than in other liquid infiltration processes developed in other laboratories.

Finally, according to a further characteristic of the invention the production process of a ceramic composite of the SiC/SiC type includes a preliminary step of providing the inert powders to be used for the infiltration, in which step the filling powders are produced by a laser pyrolysis process in which a c.w. (continuous wave) $CO_2$ laser heats a molecular beam of gas precursors (e.g. silane and acetylene). This causes the decomposition thereof and the formation of particles with a size, in the specific case of SiC, controlled by the reaction temperature (preferably 1700° to 2000° C.) and the dwell time (preferably 2 to 10 millisec) of the gas precursors in the radiation area. Advantageously, such a preliminary step provides particles of nanometric granulometry with specific surface areas in the range of 50–120 $m^2/g$ and with an extremely narrow size distribution. Preferably, the range for size distribution is 20 to 30%. For example, this may be +/−10 to 15% from the average particle size.

What is described above relates to a particular case concerning non-limiting examples. However, it is evident that such a process may generally be applied to the production of CMCs based on different materials. It is also evident that products of different shape can have different operative parameters even if they are obtained by the same process and they do not depart from the scope of present industrial invention.

What is claimed is:

1. A process for making ceramic composite material comprising the steps of:
   step I: impregnating the single cloths of ceramic fibers with a solution of a polymer which is a ceramic precursor;
   step II: hardening the cloths provided by step I;
   step III; pyrolysis of the hardened cloths to form a pyrolyzed material;
   step IV; repeatedly thickening the pyrolyzed material by a thickening process comprising infiltrating polymer which is a ceramic precursor into the pyrolyzed material and pyrolyzing the material after infiltration;
   wherein the precursor solution of said step I comprises filling powder with a nanometric granulometry, wherein the particle sizes of respective particles of the filling powder are lower than a mean distance between the fibers and wherein the nanometric powder of said step I is subjected to a surface treatment with sterically acting dispersants in an amount of 1–2% relative to said powder so as to facilitate the dispersion and lower the solution viscosity.

2. The process according to claim 1, wherein said step I provides the impregnation of SiC fiber cloths having a diameter of 10–15 $\mu$m, by a polycarbosilane (PCS) containing filling powder of SiC with nanometric (nm) granulometry.

3. The process according to claim 1, wherein the precursor solution of said step I is polycarbosilane (PCS) solubilized in toluene with a concentration of 50–70% by weight and mixed homogeneously with nanometric powder of SiC previously dispersed into the same solvent with a concentration of 10% and at such a varying proportion that the PCS/powder weight ratio is not greater than 60–40.

4. The process according to claim 1, wherein the dispersant comprises dodecanol.

5. The process according to claim 1, wherein in said hardening step II the cloths impregnated in advance are piled up so that the fibers are oriented at 0° and 90° until the desired thickness is reached, the thickening of the thus obtained panels being carried out under vacuum at elevated temperature followed by application of mechanical pressure to the cloths.

6. The process of claim 5, wherein the vacuum is at about $10^{-2}$ bar, the heating is at a rate of 10° to 15° C. per minute to 300° C. and the mechanical pressure applies a pressure of about 40 $kg/cm^2$ during about 10 minutes so that thermoplastic resin of the polymeric precursor solution melts to size among the several layers and suppress both macro- and microvoids in the hardened cloths.

7. The process according to claim 1, wherein said thickening step IV is carried out through an alternation of infiltrations of a polymer solution, formed by 50–70% by weight of polycarbosilane in toluene, and pyrolysis.

8. The process according to claim 1, wherein in said thickening step IV the first cycle is carried out by using a polycarbosilane solution also containing filling nanometric powders.

9. The process according to claim 8, wherein the solution contains the filling nanometric powder in an amount of at most 30% by weight related to the polycarbosilane.

10. The process according to claim 1, further comprising producing the filling powders by a laser pyrolysis process in which a laser heats a molecular beam of gas precursors causing the decomposition thereof and the formation of SiC particles with a size controlled by the reaction temperature and the dwell time of the gas precursors in the radiation area until particles of nanometric granulometry with specific surfaces in the range of 50–120 $m^2/g$ are obtained.

11. The process according to claim 10, wherein the size of the particles is controlled by the reaction temperature and the dwell time to have a range for size distribution of 20 to 30%.

12. The process according to claim 10, wherein the gas precursors are silane and acetylene.

13. A process for making ceramic composite material comprising the steps of:
   hardening a pile of overlapped and compacted fiber cloths, by a <24 hours treatment of infiltation of SiC from a vapor phase to produce hardened fiber cloths; and
   repeatedly thickening the hardened fiber cloths by infiltrating a solution of a polymer which is a ceramic precursor into the hardened fiber cloths and pyrolyzing the material after infiltration, wherein the solution of the infiltrating step of a first of the repeated thickenings comprises filling powder with a nanometric granulometry, wherein the particle sizes of respective particles of said powder are lower than a mean distance between the fibers of the cloths and wherein the filling powder is produced by a laser pyrolysis process in which a laser heats a molecular beam of gas precursors, causing the decomposition thereof and the formation of SiC particles with a size controlled by the reaction temperature and the dwell time of the gas precursors in the radiation area.

14. The process of claim 13, wherein the cloths are overlapped at 0° and 900 ° and compacted so that the fiber true volume is the same as or greater than 35% of the apparent pile volume.

15. The process according to claim 13, wherein said thickening step is carried out through an alternation of infiltrations of a polymer solution, formed by 50–70% by weight of polycarbosilane in toluene, and pyrolysis.

16. The process according to claim 13, wherein the solution contains the filling nanometric powder in an amount of at most 30% by weight related to the polycarbosilane.

17. The process according to claim 13, wherein particles of nanometric granulometry with specific surfaces in the range of 50–120 $m^2/g$ are obtained.

18. The process according to claim 17, wherein the size of the particles is controlled by the reaction temperature and the dwell time to have a range for size distribution of 20 to 30%.

19. The process according to claim 17, wherein the gas precursors are silane and acetylene.

20. The process of claim 1, wherein the filling powder is inert and has specific surface area in the range of 50–120 $m^2/g$ and a range for size distribution of 20 to 30%.

21. The process of claim 10, wherein the laser is a c.w. $CO_2$ laser.

22. The process of claim 17, wherein the laser is a c.w. $CO_2$ laser.

23. A process for making ceramic composite material comprising the steps of:

step I: impregnating the single cloths of ceramic fibers with a solution of a polymer which is a ceramic precursor;

step II: hardening the cloths provided by step I;

step III; pyrolysis of the hardened cloths to form a pyrolysed material;

step IV; repeatedly thickening the pyrolyzed material by a thickening process comprising infiltrating polymer which is a ceramic precursor into the pyrolyzed material and pyrolyzing the material after infiltration;

wherein the precursor solution of said step I comprises filling powder with a nanometric granulometry, wherein the particle sizes of respective particles of the filling powder are lower than a mean distance between the fibers and wherein the filling powder is produced by a laser pyrolysis process in which a laser heats a molecular beam of gas precursors, causing the decomposition thereof and the formation of SiC particles with a size controlled by the reaction temperature and the dwell time of the gas precursors in the radiation area.

* * * * *

UNITED STATES PATENT AND TRADEMARK OFFICE
CERTIFICATE OF CORRECTION

PATENT NO. : 5,853,653
DATED : December 29, 1998
INVENTOR(S) : Aldo DONATO et al It is certified that error appears in the above-identified patent and that said Letters Patent is hereby corrected as shown below:

On the title page item [73], change "Technologie" to --Tecnologie--.

Signed and Sealed this

Twenty-sixth Day of September, 2000

*Attest:*

Q. TODD DICKINSON

*Attesting Officer*  *Director of Patents and Trademarks*